US012761628B2

United States Patent
(12) United States Patent
Catana Salazar et al.

(10) Patent No.: US 12,761,628 B2
(45) Date of Patent: Oct. 13, 2026

(54) OBJECT PACKINGS WITH VOLUME SUBSETS

(71) Applicants: Peridot Print LLC, Palo Alto, CA (US); INSTITUTO ATLANTICO, Bairro Edson Queiroz (BR)

(72) Inventors: Juan Carlos Catana Salazar, Guadalajara (MX); Alyne Gomes Soares Cantal, Porto Alegre (BR); Andre Luiz Lima Pedro, Porto Alegre (BR); Scott Alan White, Boise, ID (US); Jun Zeng, Palo Alto, CA (US)

(73) Assignees: PERIDOT PRINT LLC, Palo Alto, CA (US); INSTITUTO ATLANTICO, Fortaleza (BR)

( * ) Notice: Subject to any disclaimer, the term of this patent is extended or adjusted under 35 U.S.C. 154(b) by 451 days.

(21) Appl. No.: 18/038,151

(22) PCT Filed: Dec. 21, 2020

(86) PCT No.: PCT/US2020/066418

§ 371 (c)(1),
(2) Date: May 22, 2023

(87) PCT Pub. No.: WO2022/139792

PCT Pub. Date: Jun. 30, 2022

(65) Prior Publication Data

US 2024/0103488 A1 Mar. 28, 2024

(51) Int. Cl.

*G05B 19/4099* (2006.01)
*B33Y 10/00* (2015.01)

(Continued)

(52) U.S. Cl.

CPC .......... *G05B 19/4099* (2013.01); *B33Y 10/00* (2014.12); *B33Y 30/00* (2014.12); *B33Y 50/02* (2014.12); *G05B 2219/49023* (2013.01)

(58) Field of Classification Search

CPC ...... G05B 19/4099; G05B 2219/49023; B33Y 10/00; B33Y 30/00; B33Y 50/02; G06F 30/17; G06F 2111/06; G06F 2113/20

See application file for complete search history.

(56) References Cited

U.S. PATENT DOCUMENTS

| | | |
|---|---|---|
| 6,721,762 B1 | 4/2004 | Levine et al. |
| 6,928,331 B2 | 8/2005 | Wishengrad |

(Continued)

FOREIGN PATENT DOCUMENTS

| | | |
|---|---|---|
| CN | 104842564 A | 8/2015 |
| CN | 103473617 B | 7/2016 |

(Continued)

OTHER PUBLICATIONS

Aspe, "Dimensional Accuracy and Surface Finish in Additive Manufacturing", ASPE Spring Topical Meeting, Apr. 13, 2014, 244 pages.

(Continued)

*Primary Examiner* — Yuhui R Pan

(74) *Attorney, Agent, or Firm* — Law Offices of Michael Dryja; Michael Dryja

(57) ABSTRACT

Examples of methods for object packings are described herein. In some examples, a method includes loading a first object in a first subset of a volume. In some examples, the method includes determining, using a genetic procedure, an arrangement of second objects in a second subset of the volume to produce a packing that includes the first object and the second objects.

14 Claims, 4 Drawing Sheets

(51) Int. Cl.

| | |
|---|---|
| ***B33Y 30/00*** | (2015.01) |
| ***B33Y 50/02*** | (2015.01) |

(56) References Cited

U.S. PATENT DOCUMENTS

| | | | | |
|---|---|---|---|---|
| 6,941,365 | B2 | 9/2005 | Sirgany | |
| 6,957,200 | B2 | 10/2005 | Buczak et al. | |
| 6,980,934 | B1 * | 12/2005 | Sadovnik | G06F 30/13 206/505 |
| 7,181,702 | B2 | 2/2007 | Horn | |
| 7,215,336 | B2 | 5/2007 | Fujiwara et al. | |
| 7,236,911 | B1 | 6/2007 | Gough et al. | |
| 7,328,194 | B2 | 2/2008 | Dimitriou et al. | |
| 7,398,257 | B2 | 7/2008 | Kaji | |
| 7,505,947 | B2 | 3/2009 | McArdle | |
| 8,554,702 | B2 | 10/2013 | Arunapuram | |
| 8,838,510 | B2 | 9/2014 | Baughman et al. | |
| 9,317,626 | B2 | 4/2016 | Chan | |
| 9,443,346 | B2 | 9/2016 | Ikits | |
| 10,552,095 | B1 | 2/2020 | Lawson et al. | |
| 2001/0011258 | A1 | 8/2001 | Shinagawa | |
| 2002/0133797 | A1 | 9/2002 | Sasagawa et al. | |
| 2004/0167721 | A1 | 8/2004 | Murakawa et al. | |
| 2005/0021238 | A1 | 1/2005 | Mcguffin et al. | |
| 2005/0074806 | A1 | 4/2005 | Skierczynski et al. | |
| 2006/0155418 | A1 | 7/2006 | Bradbury et al. | |
| 2006/0200436 | A1 | 9/2006 | Zhou et al. | |
| 2006/0224273 | A1 | 10/2006 | Cheng et al. | |
| 2007/0192263 | A1 | 8/2007 | Zhu | |
| 2009/0313191 | A1 | 12/2009 | Yao et al. | |
| 2009/0319453 | A1 | 12/2009 | Goel | |
| 2009/0326706 | A1 | 12/2009 | Fink et al. | |
| 2013/0185234 | A1 | 7/2013 | Arora et al. | |
| 2014/0039847 | A1 | 2/2014 | Georgescu et al. | |
| 2014/0081603 | A1 | 3/2014 | Griffith et al. | |
| 2014/0320490 | A1 | 10/2014 | Delfino et al. | |
| 2015/0154321 | A1 | 6/2015 | Schmidt et al. | |
| 2015/0251356 | A1 | 9/2015 | Batchelder | |
| 2015/0331402 | A1 | 11/2015 | Lin et al. | |
| 2016/0085882 | A1 | 3/2016 | Li et al. | |
| 2016/0279880 | A1 | 9/2016 | Zeng et al. | |
| 2017/0154127 | A1 | 6/2017 | Madmony et al. | |
| 2017/0176979 | A1 | 6/2017 | Lalish et al. | |
| 2017/0252978 | A1 * | 9/2017 | Claes | G05B 19/4099 |
| 2017/0304944 | A1 | 10/2017 | Symeonidis et al. | |
| 2017/0309079 | A1 | 10/2017 | Naples et al. | |
| 2017/0352195 | A1 | 12/2017 | Grube et al. | |
| 2018/0024517 | A1 | 1/2018 | Halperin | |
| 2018/0043635 | A1 | 2/2018 | Mantha et al. | |
| 2018/0099454 | A1 | 4/2018 | Hummeler et al. | |
| 2018/0111320 | A1 * | 4/2018 | Zhao | B29C 64/393 |
| 2018/0133969 | A1 | 5/2018 | Huang et al. | |
| 2018/0259939 | A1 * | 9/2018 | Garcia | B29C 64/393 |
| 2018/0260714 | A1 | 9/2018 | Li et al. | |
| 2018/0329658 | A1 | 11/2018 | Collomp | |
| 2019/0080244 | A1 | 3/2019 | Pei et al. | |
| 2019/0114581 | A1 | 4/2019 | Vilag et al. | |
| 2019/0228114 | A1 | 7/2019 | Griffith et al. | |
| 2019/0378232 | A1 | 12/2019 | Goren et al. | |
| 2020/0019918 | A1 | 1/2020 | Li | |
| 2020/0027003 | A1 | 1/2020 | Wu et al. | |
| 2020/0174713 | A1 * | 6/2020 | Lawson | G06F 3/125 |
| 2020/0193716 | A1 | 6/2020 | Ge et al. | |
| 2021/0339478 | A1 * | 11/2021 | Gonzalez Martin | B29C 64/20 |
| 2022/0250261 | A1 | 8/2022 | Howard et al. | |

FOREIGN PATENT DOCUMENTS

| | | | |
|---|---|---|---|
| CN | 107160670 | A | 9/2017 |
| CN | 107206495 | A | 9/2017 |
| CN | 107206683 | A | 9/2017 |
| CN | 104504468 | B | 3/2018 |
| CN | 109447311 | A | 3/2019 |
| CN | 110490371 | A | 11/2019 |
| CN | 111382485 | A | 7/2020 |
| EP | 1645640 | A2 | 4/2006 |
| EP | 3200980 | A1 | 8/2017 |
| KR | 10-2016-0136761 | A | 11/2016 |
| WO | 2016/053305 | A1 | 4/2016 |
| WO | 2016/195665 | A1 | 12/2016 |
| WO | 2017/023284 | A1 | 2/2017 |
| WO | 2017/074490 | A1 | 5/2017 |
| WO | 2017/077508 | A1 | 5/2017 |
| WO | 2017/196346 | A1 | 11/2017 |
| WO | 2019/117963 | A1 | 6/2019 |
| WO | 2020/023048 | A1 | 1/2020 |
| WO | 2020/122876 | A1 | 6/2020 |
| WO | 2020/131046 | A1 | 6/2020 |
| WO | 2020/159469 | A1 | 8/2020 |

OTHER PUBLICATIONS

Dickinson et al., "Packing Subsets of 30 Parts for Layered Manufacturing", International Journal of Smart Engineering System Design, vol. 4, No. 3, Jan. 1, 2002, pp. 147-161.

Multi-objective Optimization of 3d Packing Problem in Additive Manufacturing, Jan. 2014, https://www.researchgate.net/publication/288147774_Multi-objective_optimization_of_3D_p, 3 pages.

Justin O. et al. Large-Scale Identification of Single-Feature Polymorphisms in Complex Genomes. Genome Res., 2003 13: 513-523.

Mancapa, V., et al., "A genetic algorithm for two dimensional strip packing problems.", South African Journal of Industrial Engineering, vol. 20, No. 2, 2009, pp. 145-162.

Sheng-Jun, Q., "Study on Rapid Layout Optimization for Package Transportation of Aeronautics System", Aeronautical Computing Technique, vol. 45, No. 06, Nov. 2015, 5 pages.(English Abstract Only).

De Anton et al., "Production Planning in 3D Printing Factories", International Journal of Production Management and Engineering, 8(2), 2020, pp. 75-86.

Ghosh, "Incorporating Gender and Age in Genetic Algorithms to Solve the Indexing Problem", IIMA Working Papers, WP2016-03-32, Indian Institute of Management Ahmedabad, Research and Publication Department, Mar. 2016, pp. 1-11.

* cited by examiner

OBJECT PACKINGS WITH VOLUME SUBSETS

BACKGROUND

Three-dimensional (3D) solid objects may be produced from a digital model using manufacturing. Additive manufacturing is an example of manufacturing. Additive manufacturing may be used in rapid prototyping, mold generation, mold master generation, and short-run manufacturing. Additive manufacturing involves the application of successive layers of build material. In some additive manufacturing techniques, the build material may be cured or fused. Other machining processes remove material to create the final object.

DETAILED DESCRIPTION

Figure 1:
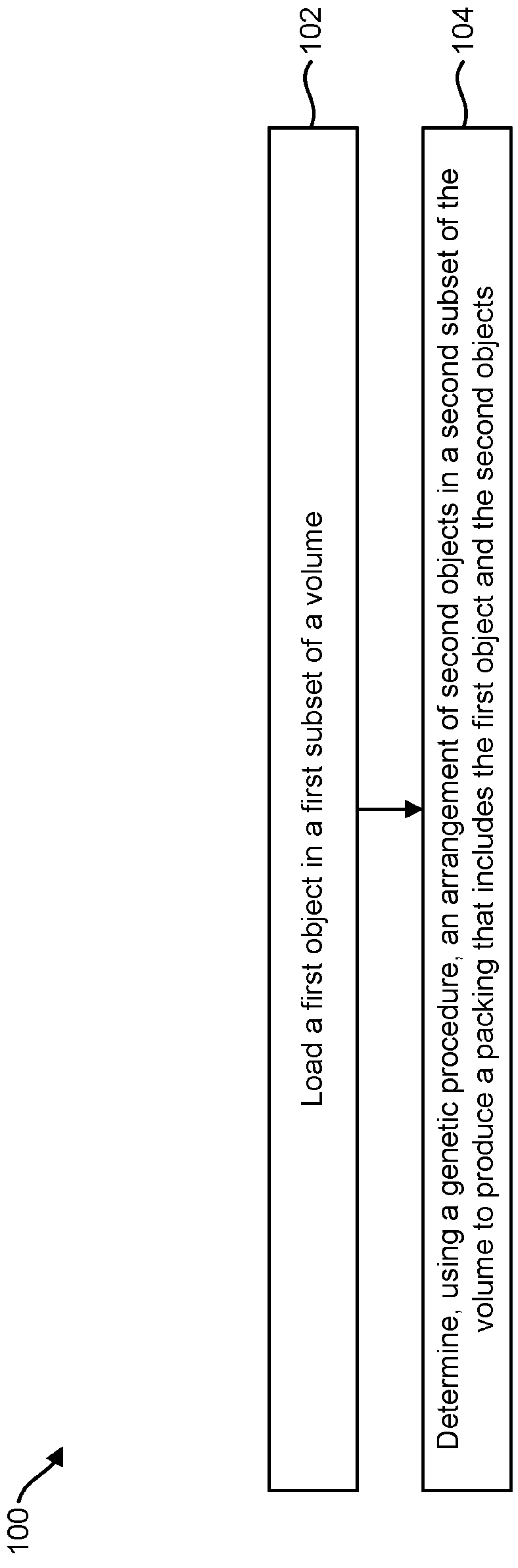
FIG. 1 is a flow diagram illustrating an example of a method for object packing with volume subsets.

Additive manufacturing may be used to manufacture three-dimensional (3D) objects. 3D printing is an example of additive manufacturing. Performing additive manufacturing may rely on a packing. A packing is information that specifies an arrangement of objects in a volume. An arrangement is a position(s), location(s), and/or orientation(s), etc., of an object or objects. An "object" may refer to a geometrical representation or 3D shape. A volume is a 3D space. A build volume is a volume that may be used for manufacturing. In some examples, a build volume may correspond to a physical space in which additive manufacturing may be performed. In some examples, a volume, build volume, or volume subset may be structured as a 3-dimensional space bounded by a predefined polyhedron (e.g., a set of vertices, edges, and faces) that specifies the packing space scope. For example, a cuboidal space may be defined by 8 vertices (e.g., V={v1=(0,0,0), v2=(0,20,0), v3=(20,0,0), v4=(20,20,0), v5=(0,0,80), v6=(0,20,80), v7=(20,0,80), v8=(20,20,80)}), 12 edges (e.g., E={e1=(v1,v2), e2=(v1,v3), e3=(v1,v5), e4=(v2,v4), e5=(v2,v6), e6=(v3,v4), e7=(v3,v7), e8=(v4,v8), e9=(v5,v6), e10=(v5,v7), e11=(v6,v8), e12=(v7,v8)}), and 6 faces (e.g., F={f1={e1,e7,e10,e3}, f2={e6,e8,e12,e7}, f3={e8,e11,e5,e4}, f4={e2,e5,e9,e3}, f5={e1,e6,e4,e2}, f6={e10,e12,e11,e9}}). Different vertices, edges, and/or faces (and/or quantities thereof) may be utilized in some examples.

It may be helpful to increase packing density in the build volume to increase production and/or reduce manufacturing costs. In some examples, a build volume (e.g., packing space) may be a cuboidal space with x, y, and z dimensions. For example, a build volume may be a cuboid with dimensions of 284 millimeters (mm) in the x axis by 380 mm in the y axis by 380 mm in the z axis. Some of the techniques described herein may be utilized to pack objects into a volume (e.g., build volume) that is partially filled (e.g., partially filled with a previously set arrangement of objects).

In some examples, object packing may be based on an objective or objectives. An example of an objective is packing density (e.g., increasing or maximizing packing density). Object packing questions may be computationally intensive to solve, being nondeterministic polynomial-(NP-) complete. For example, computational complexity may grow exponentially in NP-complete questions. For instance, the size of the solution space (e.g., number of possible packing arrangements) for placement of objects (without rotation, for example) in a relatively small batch of 20 objects, is beyond the order of $1\times10^{18}$. Some examples of the techniques described herein may provide practical and/or near-optimal approaches for object packing. For instance, some of the techniques described herein may enable searching over the solution space while prioritizing portions that have a greater probability of producing a near-optimal solution. In some examples, a relatively small portion of the solution space may be searched.

Throughout the drawings, identical reference numbers may or may not designate similar or identical elements. Similar numbers may or may not indicate similar elements. When an element is referred to without a reference number, this may refer to the element generally, with or without limitation to any particular drawing or figure. The drawings are not necessarily to scale, and the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for object packing with volume subsets. The method 100 and/or a method 100 element or elements may be performed by an apparatus (e.g., electronic device). For example, the method 100 may be performed by the apparatus 202 described in relation to FIG. 2.

An apparatus may load 102 a first object or objects in a first subset of a volume. A subset of a volume or a volume subset is a portion or portions of a volume. For example, a subset of a volume may be a portion (e.g., region or regions) of the volume that is associated with (e.g., occupied by, anticipated to be occupied by, etc.) an object or objects. In some examples, a subset of a volume may be specified by the shape, size, position, and/or orientation of an object or objects. For example, the apparatus may load 102 a first object or objects by designating a location(s), placement(s), orientation(s), etc., of the object(s) and/or by placing the first object(s) in the volume. In some examples, the region (e.g., voxels) designated for and/or occupied by the first object(s) may be the first subset of the volume. For instance, the first subset may be coextensive with the space designated for and/or occupied by the first object(s). In some examples, the first subset of the volume may be a region that is larger than the first object(s) within which the first object(s) may be placed. For instance, the first subset may be a bounding box, rectangular prism, sphere, etc., within which the first object(s) may be placed. In some examples, the first object(s) may have associated coordinates (e.g., x, y, and z coordinates) that indicate a designated placement or placements in the volume.

In some examples, loading 102 the first object(s) in the first subset of the volume may include designating and/or placing the first object(s) in a static arrangement (e.g., static location(s), position(s), orientation(s), etc.) in the volume. For instance, the apparatus may designate and/or place the first object(s) in the volume at the coordinates associated with the first object(s). In some examples, the arrangement of the first object(s) may be previously determined and/or established. For instance, the arrangement of the first object(s) may be determined and/or established based on received input (e.g., an input indicating coordinates of the first object(s)) and/or based on a previous procedure (e.g., previous genetic procedure, previous random placement, etc.). For example, the apparatus or another device may receive an input (e.g., keyboard input, touchscreen input, mouse input, wireless signal, and/or stylus input, etc.) that indicates the arrangement (e.g., location(s), position(s), orientation(s), and/or coordinate(s), etc.). In some examples, the apparatus or another device may execute a genetic procedure to determine the arrangement (e.g., location(s), position(s), orientation(s), and/or coordinate(s), etc.). The apparatus may determine the arrangement of the first object(s) and/or may receive the arrangement of the first object(s) from another device (e.g., a device in communication with the apparatus, a networked device, a server, and/or a thumb drive, etc.).

The apparatus may determine 104, using a genetic procedure, an arrangement of second objects in a second subset of the volume to produce a packing that includes the first object and the second object. A genetic procedure is a computational procedure. For example, a genetic procedure may be a metaheuristic procedure that includes evolution and/or selection mechanisms for determining a solution. In some examples, a genetic procedure may be a technique utilized in artificial intelligence. In some examples, the genetic procedure may include initializing a population, evaluation, selection, crossover, and/or mutation operations. In some examples, evaluation, selection, crossover, and/or mutation may be performed repeatedly (e.g., iteratively, recursively, etc.) until an end condition is met. In some examples, determining 104 the arrangement using a genetic procedure may be performed in initializing a population, crossover, and/or mutation operations. A population is a group or set of chromosomes.

A chromosome is data. For example, a chromosome may include data representing a potential solution for a question that the genetic procedure is to address. For instance, a chromosome may indicate a packing of objects in a volume (e.g., build volume). A packing is an organization of objects. For instance, chromosomes may indicate packing positions. A packing position is a pose of an object in a build volume. In some examples, a chromosome may include data indicating a set of object identifiers and poses. An object identifier is information (e.g., number, floating point number, integer, string, character(s), name, etc.) that identifies an object. A pose is information indicating a location and/or orientation of an object. For instance, a pose may indicate a location (e.g., translation) of an object in a build volume and/or an orientation (e.g., rotation(s) in a dimension or dimensions) of an object in a build volume. In some examples, a pose may be expressed as a number or numbers (e.g., floating point numbers, integers, etc.), vector(s), matrix or matrices, quaternion(s), etc. In some examples, a chromosome may include an object identifier with a first axis rotation (e.g., x), a second axis rotation (e.g., y), and a third axis rotation (e.g., z) for each of a set of objects. In some examples, a chromosome may include an object identifier with an orientation (and without location, for instance) for each of a set of objects. In some examples, each gene of a chromosome may include an object identifier and/or pose (e.g., orientation and/or location). In some examples, a portion of a chromosome may correspond to the first object(s) and a portion of the chromosome may correspond to the second object(s). For instance, a gene or genes of a chromosome may indicate and/or represent the first object(s), and another gene or genes of the chromosome may indicate and/or represent the second object(s).

In some examples, a chromosome may include data for each object in an order or sequence. In some examples, the order or sequence of a chromosome may correspond to a packing order in the volume (e.g., build volume). For instance, the apparatus may place the objects of a chromosome in the volume (e.g., build volume) in the order or sequence indicated in the chromosome. In some cases, consecutive objects in a chromosome may be placed adjacently in the volume if volume dimensions allow, to an extent that volume dimensions allow, and/or to an extent that previously-placed object(s) allow. In some examples, the order or sequence may establish a priority queue. For instance, the order or sequence may indicate an order that objects may be introduced into a build volume. In some examples, a chromosome may include an object identifier and rotations for respective objects from object 1 to object n. For instance, a chromosome may encode an object list, where each element of the list indicates an identifier of an object and/or rotation angles corresponding to axes (e.g., in x, y, and z axes). In some examples, the order or sequence of a chromosome may be an order or sequence of object identifiers. In some examples, each chromosome may represent a potential packing described as a sequence of object identifiers with associated poses.

In some examples, a portion of a chromosome that indicates and/or represents the first object(s) may be an initial portion of the chromosome, and/or a portion of a chromosome that indicates and/or represents the second object(s) may be a last portion of the chromosome. For instance, the first object(s) may be packed first in the sequence of the chromosome followed by the second object(s) in some approaches.

In initializing a population, the apparatus may randomly initialize a set of chromosomes and/or portions of chromosomes. For example, the apparatus may utilize a random number generator to generate random poses for a set of objects (to be packed in a build volume, for instance). In some examples, the initialized set of chromosomes and/or portions of chromosomes may include sequences of object identifiers and poses. In some examples, the apparatus may initialize a portion or portions of a chromosome or chromosomes for the second object(s). For instance, the apparatus may randomly initialize a portion of a chromosome for the second object(s), while another portion of the chromosome may be set to and/or include previously determined information (e.g., gene(s), object identifier(s), pose(s), etc.) for the first object(s). In some examples, the first object(s) may be represented in a locked (e.g., non-modifiable) portion of a chromosome and/or the second object(s) may be represented in a modifiable portion of the chromosome. In some examples, the first object(s) may be excluded from and/or not represented in the chromosome(s). In some examples, the first object(s) may be static or stationary. For instance, the position and/or orientation (e.g., coordinates) of the first object(s) may be locked and/or unmodified during execution of a genetic procedure.

In performing evaluation, the apparatus may evaluate and/or rank the chromosomes according to a value or values. Examples of values include fitness measures. A fitness measure is a measure that indicates a degree to which a chromosome (e.g., packing) satisfies an objective or objectives (e.g., increased packing density, decreased packing height, decreased z-axis measure, and/or reduced re-radiation impacts, etc.). For example, the fitness measure may be evaluated for each chromosome (e.g., packing). Examples of fitness measures may include quantity of objects packed, packing density, and/or packing height (e.g., z-height). The quantity of objects packed is a quantity of objects that fit within the volume (e.g., build volume) for a chromosome. A quantity of objects packed may be determined for each chromosome.

In some examples, a value or values (e.g., fitness measure, quantity of objects packed, packing density, and/or packing height, etc.) may be utilized to rank or order chromosomes. In some examples, a group of values (e.g., fitness measure, quantity of objects packed, packing density, and/or packing height, etc.) may be assembled and/or combined to form a packing score that can be utilized to rank one packing over another packing. For instance, a packing score may be determined based on a function, combination, mapping, weighted sum, average, etc., of multiple values (e.g., fitness measure, quantity of objects packed, packing density, and/or packing height, etc.). In some examples, chromosomes with a relatively greater packing density, a relatively greater quantity of objects packed, and/or a relatively lesser packing height may be ranked higher than other chromosomes.

In some examples, the value(s) (e.g., fitness measure(s), packed quantity(ies), packing density(ies), and/or packing height(s), etc.) may be determined based on a placement procedure. An example of a placement procedure is a bottom-front-left placement procedure. For instance, the objects of a chromosome may be placed in the volume (e.g., build volume) in accordance with the placement procedure to produce a packing. The value(s) (e.g., fitness measure(s), packed quantity(ies), packing density(ies), and/or packing height(s), etc.) may be determined (e.g., calculated, computed, etc.) based on the packing.

In some examples, a bottom-front-left placement procedure may utilize the object sequence of a chromosome to enter each object in sequence (e.g., one after another in the given order). The bottom-front-left placement procedure (e.g., heuristic) may enter an object from a top-back-right corner of a build volume (or volume subset), and move (e.g., incrementally move, continuously move, etc.) the object downward (e.g., along a z axis) until contacting with (or colliding with or coming within a distance from) another object or contacting with (or colliding with or coming within a distance from) a build volume (or volume subset) frontier (e.g., edge, boundary, face, etc.). Examples of the distance may include 0.01 mm, 0.1 mm, 0.5 mm, 1 mm, 2 mm, 5 mm, etc. The object may then be moved from a back of the build volume (or volume subset) frontward (e.g., along a y axis) until contacting with (or colliding with or coming within a distance from) another object or contacting with (or colliding with or coming within a distance from) a build volume (or volume subset) frontier. The object may then be moved from a right side of the build volume (or volume subset) leftward (e.g., along an x axis) until contacting with (or colliding with or coming within a distance from) another object or contacting with (or colliding with or coming within a distance from) a build volume (or volume subset) frontier. Other placement procedures may be utilized in some examples. For instance, other placement procedures that place the objects of the chromosome(s) in different orders and/or proceeding in different directions may be utilized in some examples.

In performing selection, the apparatus may eliminate a quantity of the chromosomes. For instance, the apparatus may eliminate (e.g., discard, delete, remove, exclude, etc.) a quantity of the lowest ranked chromosomes (e.g., a percentage of lowest ranked chromosomes, a quantity of lowest ranked chromosomes, etc.). In some examples, the chromosomes may be categorized based on rank. For example, a first quantity (e.g., percentage of chromosomes, number of chromosomes, etc.) of the chromosomes may be categorized in a first category. For instance, the first quantity may be a set of highest ranked chromosomes. The first quantity of chromosomes may be referred to as elite chromosomes (e.g., a quantity of chromosomes with best fitness measures, quantities of objects packed, packing height, and/or packing density). In some examples, a gene or genes (e.g., object identifier(s) and/or pose(s)) of the elite chromosomes may be preserved and/or propagated to a subsequent (e.g., next) generation of chromosomes. A generation is a set of chromosomes (e.g., packings). For example, a generation may correspond to each iteration of the genetic procedure.

In some examples, selection may include chromosome selection for propagation (e.g., mutation and/or crossover) and/or packing (e.g., selecting a chromosome for a packing solution). For instance, the apparatus may select a chromosome or chromosomes based on a rank that is based on fitness scores, quantities of objects packed, packing density, and/or packing height, etc.

In some examples, selecting a chromosome may be based on a value or values. In some examples, selecting a chromosome for propagation is based on a fitness score. For example, a chromosome or chromosomes with better (e.g., a set of top) fitness scores may be selected for propagation and/or packing. For instance, selecting a chromosome for propagation may be based on a quantity of objects packed. For instance, chromosomes with higher quantities of objects packed, higher packing density, and/or lower packing height may be selected for propagation and/or packing. In some examples, first portions of chromosomes corresponding to the first object(s) may be propagated without modification to a subsequent generation or generations. In some examples, the chromosomes may not include portions corresponding to the first object(s).

In performing crossover, the apparatus may utilize a second quantity of chromosomes and elite chromosomes. The second quantity of the chromosomes may be referred to as crossover chromosomes. The second quantity of chromosomes may be ranked below the elite chromosomes. For instance, the apparatus may randomly select chromosomes that are ranked below the elite chromosomes to select the crossover chromosomes. The apparatus may crossover the crossover chromosomes with the elite chromosomes. For example, the apparatus may combine a part or parts (e.g., gene(s), object identifier(s), pose(s), location(s), orientation(s), rotation(s), and/or sequence position(s)) of an elite chromosome with a part or parts (e.g., gene(s), object identifier(s), pose(s), location(s), orientation(s), rotation(s), and/or sequence position(s)) of a crossover chromosome to generate a child chromosome in a subsequent (e.g., next) generation of chromosomes.

In performing mutation, the apparatus may randomly mutate an elite chromosome or elite chromosomes. For example, the apparatus may randomly change a gene or genes (e.g., object identifier(s), pose(s), location(s), orientation(s), rotation(s), and/or sequence position(s)) of an elite chromosome or elite chromosomes. The chromosomes to be mutated may be referred to as mutation chromosomes.

In some examples, a constant population size (e.g., number of chromosomes) may be maintained over generations. In some examples, the population size may vary over generations. In some examples, new random chromosomes may be added. For instance, a set of randomly generated chromosomes may be added to the elite chromosomes, crossover chromosomes, and mutation chromosomes. For instance, adding new random chromosomes may maintain the constant population size. The random chromosomes may be useful for driving a random search in different directions in the solution space. In some approaches, mutations of chromosomes may be represented as random movements in the object sequence and/or random rotations on the object orientations. The mutation stage may be utilized to mutate elite chromosomes (e.g., good solutions) into chromosomes with increased fitness (e.g., better solutions). Performing selection, crossover, and/or mutation may produce a subsequent generation of chromosomes.

In some examples, the first object(s) may be static during execution of the genetic procedure. For instance, the pose(s), orientation(s), rotation(s), position(s), and/or location(s) of the first object(s) may be unchanged during execution of the genetic procedure. For example, the genetic procedure may not modify the first object(s) over the generation(s) of the genetic procedure. In some examples, the first object(s) may be represented in a first portion (e.g., locked portion) of a chromosome or chromosomes, where the first portion of the chromosome may not be subject to crossover and/or mutation. In some examples, the second object(s) may be represented in a second portion (e.g., modifiable portion) of a chromosome or chromosomes, where the second portion may be subject to crossover and/or mutation. In some examples, the second object(s) may be represented in the chromosomes, the first object(s) may not be represented in the chromosomes, and the whole chromosomes may be subject to an operation or operations of the genetic procedure.

In some examples, the method 100 may allow packing the second object(s) around the first object(s) (e.g., previously packed objects). For instance, the first object(s) may be packed in the first subset of the volume and the second object(s) may be packed in the second subset of the volumes around the first objects. The first subset may be mutually exclusive from the second subset. The first object(s) may be a set of static or stationary objects. In some examples, the first object(s) may be processed as shared, joint, or mutual objects. For instance, the first object(s) may be represented in first portions of all of the chromosomes. In some examples, the method 100 may include determining, using a first genetic procedure, a first arrangement of first object(s) (e.g., first objects that include the first object). The first genetic procedure may be performed in a stage before the genetic procedure (e.g., before determining 104, using the genetic procedure, the arrangement of second objects). For example, the first genetic procedure may be separate from the genetic procedure performed later. For instance, the first genetic procedure may be executed without the second object(s).

In initialization, the first object(s) (e.g., static object(s) and/or stationary object(s)) may be loaded 102 and/or placed in the build volume before entering any other object(s) (e.g., second object(s)). In some examples, a structure for collision detection may be initialized. For instance, a structure for collision detection may be initialized with the first object(s) (e.g., static object(s) and/or stationary object(s)), and then collision detection (e.g., collision queries) for the second object(s) may be performed using the structure. An example of a structure is a bounding volume hierarchy (e.g., bounding volume tree), which is a tree structure that may be utilized for performing collision detection between objects. In some examples, a bounding volume tree may be initialized with the first object(s) (e.g., static location(s), position(s), pose(s), and/or orientation(s), etc., of the first object(s)) for determining object collision. Bounding volume hierarchies may be utilized in some examples, or other techniques may be utilized in some examples. In some examples, the first object(s) (e.g., stationary object(s)) may not be included in a set of input objects (e.g., the second object(s)) to be packed. For instance, the first object(s) (e.g., stationary object(s)) may not be modified by the genetic procedure. When a second object is entered and/or placed in the build volume, the collision determination may take into account the first object(s) (e.g., stationary object(s)) and/or previously packed second object(s) to determine whether there is enough space for the second object. At the end of a packing procedure, the first object(s) (e.g., stationary object(s)) may be included in the packing.

In some examples, an operation or operations of the genetic procedure may repeat (e.g., iterate, recur, etc.). For example, evaluation, crossover, and/or mutation may be repeated for subsequent generations of chromosomes until an end condition is met (e.g., a threshold number of generations, a threshold quantity of packed objects, a threshold fitness score, and/or a threshold packing score, etc.).

In some examples, the apparatus may produce a packing by determining 104 an arrangement of second objects using a genetic procedure. For instance, the apparatus may determine arrangements of the second objects using the genetic procedure. For example, the genetic procedure may iterate to determine arrangements of the second objects over generations. A packing with an arrangement of the second objects may be produced. For instance, packings with arrangements of the second objects may be evaluated, and a packing that meets a condition may be selected, where the packing includes an arrangement of second objects.

In some examples, the method 100 may include selecting a packing based on the chromosomes (e.g., chromosomes after a generation or generations). In some examples, selecting the packing is based on the genetic procedure with an objective. For instance, the apparatus may select a chromosome that represents a packing with a highest ranking, best value(s), best packing score, maximum quantity of packed objects, best fitness score, maximum packing density, and/or minimum height, etc. In some examples, the apparatus may select the packing based on an objective (e.g., packing density, quantity of packed objects, packing height, and/or fitness, etc.) or a combination of objectives. For instance, a packing with a best combination of objectives, such as quantity of packed objects, packing density, packing height, and/or fitness score, may be selected.

In some examples, the packing may be executed to manufacture the objects. For example, the objects may be manufactured by an apparatus (e.g., 3D printer) in accordance with the selected packing. For instance, an apparatus may send the packing to another device (e.g., 3D printer) or may execute the packing to manufacture the objects in the packing. Some examples of the techniques described herein may be utilized in a variety of additive manufacturing. Some additive manufacturing techniques may be powder-based and driven by powder fusion. Some additive manufacturing techniques may include metal printing, such as metal jet fusion. Some examples of the approaches described herein may be utilized in powder bed fusion-based additive manufacturing, such as Selective Laser Melting (SLM), Selective Laser Sintering (SLS), Multi-Jet Fusion (MJF), etc.

In some examples, the method 100 may include presenting the selected packing. For instance, the apparatus may send an image of the packing to a display for presentation. In some examples, the method 100 may include sending the selected packing to another device (e.g., computing device, server, etc.). For instance, the apparatus may transmit the selected packing to another device via a network (e.g., a local area network, the Internet, etc.).

In some examples, a first object may be a proxy of printing quality. For instance, stationary objects may be utilized as diagnostic objects of printing quality of a surrounding object or objects that share the same z height. For 3D printers that work at layers or levels, manufacturing conditions (e.g., printing properties) may be the same or similar for objects located within a range (e.g., 5 layers, 10 layers, a centimeter, an inch, etc.) of the same z coordinates. Manufacturing conditions (e.g., printing properties) may be similar for a group of objects within a thermal blob (e.g., a set of objects whose thermal bubble intersects with each other). For example, the apparatus may measure a metric or metrics for an object or objects within a range from the first object by measuring the metric(s) of the first object. In some examples, the first object(s) may be proxy object(s). A proxy object is an object to evaluate manufacturing quality and/or manufacturing condition(s) for another object or objects. In some examples, a proxy object may not have utility beyond evaluating manufacturing quality and/or manufacturing condition(s) (e.g., temperature, sintering, manufacturing accuracy, etc.). In some examples, the method 100 includes manufacturing the first object(s) and the second object(s) based on the packing. For example, the apparatus may execute the packing to print the first object(s) and the second object(s) or may send the packing to another device to print the first object(s) and the second object(s). In some examples, the method 100 may include evaluating the first object(s) to determine a metric of the manufacturing. Examples of metrics of manufacturing may include object manufacturing temperature, sintering accuracy, agent distribution accuracy, and/or final object geometric accuracy. For instance, the apparatus may measure the temperature of the first object (e.g., layer or layers of the first object) during manufacturing (e.g., printing) using a thermal sensor or thermal camera, may measure the sintering accuracy (e.g., whether material is melting in accordance with first object geometry), may measure agent distribution accuracy, and/or may measure final object geometric accuracy.

In some examples, first object(s) (e.g., stationary object(s)) at a bottom of the build volume may be used for calibration (e.g., lamp energy calibration) or other initialization operation(s). In some examples, the build volume may be divided with the first object(s) (e.g., stationary object(s)) across the z axis for calibrating a print mode or modes. In some examples, the method 100 may include printing a portion of the first object(s). For instance, the apparatus may print a portion or all of the first object(s). The apparatus may calibrate a printer based on the first object. For instance, temperature of the first object(s) at or near the bottom of the build volume may be measured using a thermal sensor and/or thermal camera. The measured temperature may be utilized to calibrate a thermal lamp or lamps (e.g., to increase or decrease thermal production).

In some examples, the first object(s) (e.g., stationary object(s)) may be useful for controlling the temperature occurring in a region or regions in the build volume. For instance, if the second object(s) do not cover a large enough region or if there are not enough second object(s) to result in a threshold fusing temperature, adding the first object(s) (e.g., stationary objects) may increase and/or preserve the temperature of the region. In some examples, the first object(s) may modify thermal behavior of material in manufacturing. For instance, the first object(s) may be set and/or utilized to increase temperature in a region or regions of the build volume.

In some examples, the first object(s) may provide a physical partition or partitions of the build volume. For instance, the first object(s) (e.g., stationary object(s)) with or without annotated labels on the corresponding surface(s) may be placed for indicating a category, a position, as a barrier or separation (e.g., thin wall structures) of a group of second objects in the build volume. For example, the first object(s) may be a partition or partitions in the build volume between the second objects.

Some examples of the techniques described herein may enable incremental packing and/or grouping. For example, a set of packed objects (e.g., first objects) with locations defined in the build volume may be considered stationary objects for future arrangement and/or packing determination stages. For example, incremental packing may be allowed, where at each stage a set of packed objects becomes stationary (while packing for another set of objects is determined and/or performed, for instance). Incremental packing may be useful to operate a priority packing queue, a stage or stages of object(s) may have a packing priority. For example, first object(s) may have a first (e.g., highest) packing priority, second object(s) may have a second (e.g., next highest) packing priority, and/or third object(s) may have a third (e.g., next highest) packing priority, etc.

Figure 2:
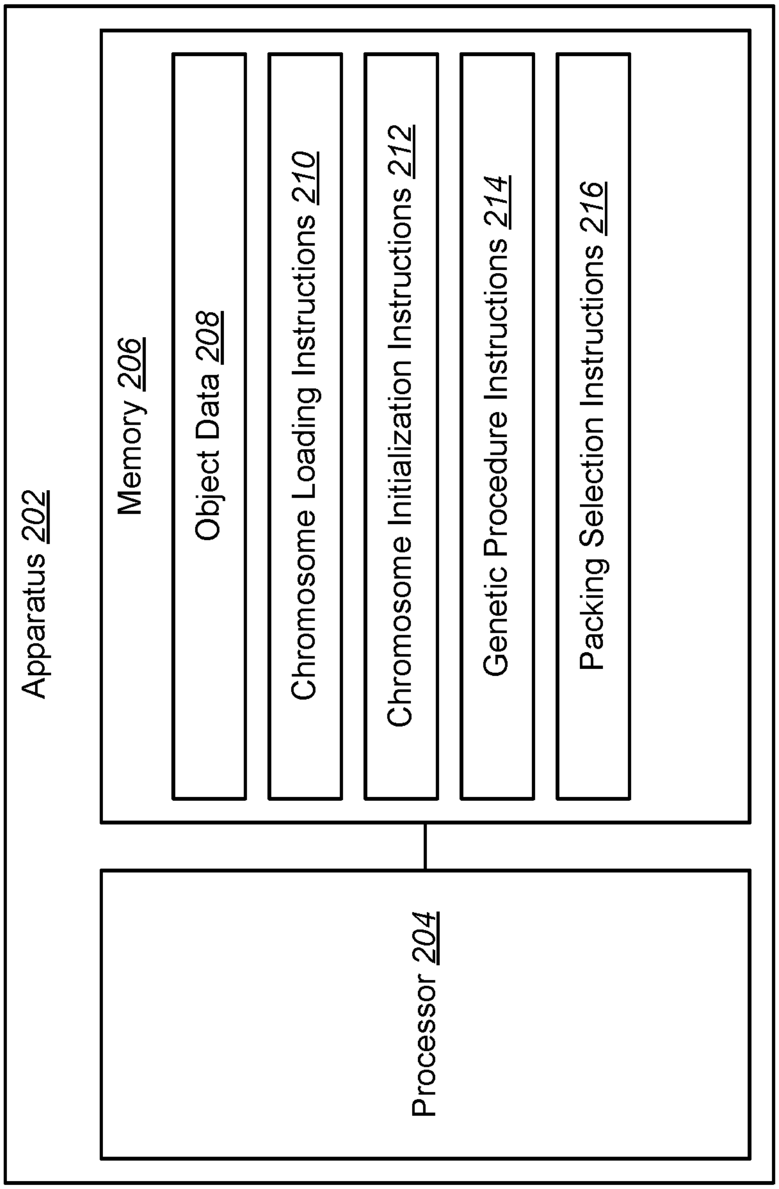
FIG. 2 is a block diagram of an example of an apparatus that may be used in object packing.

FIG. 2 is a block diagram of an example of an apparatus 202 that may be used in object packing. The apparatus 202 may be an electronic device, such as a personal computer, a server computer, a printer, a 3D printer, a smartphone, a tablet computer, etc. The apparatus 202 may include and/or may be coupled to a processor 204 and/or a memory 206. In some examples, the apparatus 202 may be in communication with (e.g., coupled to, have a communication link with) an additive manufacturing device (e.g., a 3D printing device). In some examples, the apparatus 202 may be an example of a 3D printing device. The apparatus 202 may include additional components (not shown) and/or some of the components described herein may be removed and/or modified without departing from the scope of the techniques described herein.

The processor 204 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 206. The processor 204 may fetch, decode, and/or execute instructions (e.g., chromosome initialization instructions 212, chromosome loading instructions 210, genetic procedure instructions 214, and/or packing selection instructions 216) stored in the memory 206. In some examples, the processor 204 may include an electronic circuit or circuits that include electronic components for performing a function or functions of the instructions (e.g., chromosome initialization instructions 212, chromosome loading instructions 210, genetic procedure instructions 214, and/or packing selection instructions 216). In some examples, the processor 204 may perform one, some, or all of the functions, operations, elements, methods, etc., described in relation to one, some, or all of FIGS. 1-4C.

The memory 206 may be any electronic, magnetic, optical, or other physical storage device that contains or stores electronic information (e.g., executable instructions, executable code, and/or data). The memory 206 may be, for example, Random Access Memory (RAM), Electrically Erasable Programmable Read-Only Memory (EEPROM), a storage device, an optical disc, and the like. In some examples, the memory 206 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the memory 206 may be a non-transitory tangible machine-readable (e.g., computer-readable) storage medium, where the term "non-transitory" does not encompass transitory propagating signals. In some examples, the memory 206 may include multiple devices (e.g., a RAM card and a solid-state drive (SSD)).

In some examples, the apparatus 202 may include an input/output interface (not shown in FIG. 2) through which the processor 204 may communicate with an external device or devices (not shown), for instance, to receive and store information (e.g., object data 208) pertaining to an object or objects to be manufactured (e.g., printed). The input/output interface may include hardware and/or machine-readable instructions to enable the processor 204 to communicate with the external device or devices. The input/output interface may enable a wired and/or wireless connection(s) to the external device or devices. The input/output interface may further include a network interface card and/or may also include hardware and/or machine-readable instructions to enable the processor 204 to communicate with various input and/or output devices, such as a keyboard, a mouse, a display, another apparatus, electronic device, computing device, etc., through which a user may input instructions into the apparatus 202.

In some examples, the memory 206 may store object data 208. The object data 208 may be obtained (e.g., received) from an external device and/or may be generated on the apparatus 202. For example, the processor 204 may execute instructions (not shown in FIG. 2) to receive the object data 208 from an external device.

The object data 208 may include data indicating objects and/or shapes (e.g., 3D models, dimensions, etc.) of objects. For example, the object data 208 may indicate objects for packing and/or manufacture. In some examples, the object data 208 may indicate first object(s) with a previously set or determined arrangement and/or packing.

In some examples, the processor 204 may execute chromosome loading instructions 210 to load first information into a first portion(s) of a chromosome(s). The first information may represent first objects in a static arrangement. For instance, the processor 204 may load the first information into a chromosome (or chromosomes) by setting object identifier(s) and/or object pose(s) in the first portion(s) to values of the static arrangement. In some examples, the first portions may be locked portions (e.g., non-modifiable portions) of the chromosomes. In some examples, loading the first information into the first portion(s) of the chromosome(s) may be performed as described in relation to FIG. 1.

In some examples, the processor 204 may execute the chromosome initialization instructions 212 to initialize a second portion(s) of the chromosome(s) with second information representing second objects. For example, the processor 204 may determine an initial random second portion or initial random second portions of chromosomes. In some examples, determining the set of chromosomes may include randomizing the second portion(s) of chromosome(s). For instance, the processor 204 may randomize object pose (e.g., location and/or orientation) information for second objects in the second portion(s). In some examples, a chromosome may include a sequence of object identifiers with corresponding orientations. For instance, the first portion(s) of chromosome(s) may include a sequence of first objects with corresponding orientations. The second portion(s) of chromosome(s) may include a sequence of second objects with corresponding orientations. In some examples, initializing the second portion(s) of the chromosome(s) may be performed as described in relation to FIG. 1.

In some examples, the processor 204 may execute the genetic procedure instructions 214 to execute a genetic procedure on the second portion(s) of the chromosome to determine a packing of the first objects and the second objects. In some examples, executing the genetic procedure may be performed as described in relation to FIG. 1. In some examples, the genetic procedure may not modify the first portion(s) of the chromosome(s) and/or may iterate (e.g., crossover, mutate, remove information from, insert new information into, etc.) the second portion(s) of the chromosome(s). In some examples, the first objects may have a static placement in a first subset of a volume, and the genetic procedure may iterate orientations of the second objects in a second subset of the volume. For example, the processor 204 may perform evaluation, selection, crossover, and/or mutation on the second portion(s) of the chromosome(s).

In some examples, evaluation may be performed based on whole chromosomes. In some examples, evaluation may be performed based on the second portions without the first portions. For example, the processor 204 may rank the chromosomes based on the second portions or whole chromosomes (e.g., based on values, fitness scores, quantities of packed objects, packing densities, and/or packing heights). For instance, the processor 204 may perform packing procedures based on the second portions of chromosomes (e.g., packing into the second subset) or based on whole chromosomes (e.g., packing into the whole build volume). Values (e.g., fitness scores, quantities of packed objects, packing densities, and/or packing heights) may be determined for the second portions and/or whole chromosomes (e.g., for packings corresponding to second portions and/or whole chromosomes). Selection, mutation, and/or crossover may be performed for the chromosomes (e.g., second portions of chromosomes) based on the values.

In some examples, the processor 204 may execute the genetic procedure instructions 214 to propagate a chromosome or chromosomes in a case that the evaluation is satisfied. In some examples, propagating the chromosome(s) in a case that the evaluation is satisfied may be performed as described in relation to FIG. 1. For example, the processor 204 may propagate (e.g., mutate and/or crossover) a chromosome or chromosomes that are above a ranking threshold. The apparatus 202 (e.g., processor 204) may iterate evaluating and propagating chromosomes for a generation or generations in some approaches.

In some examples, the processor 204 may execute the packing selection instructions 216 to select a packing based on the chromosome(s). For example, the processor 204 may select a chromosome as a packing with a maximum quantity of packed objects, best fitness measure, highest packing density, smallest packing height, and/or best packing score from the chromosomes (e.g., packings based on the chromosomes). In some examples, the apparatus 202 may perform manufacturing based on the selected packing. For example, the apparatus 202 may 3D print the selected packing and/or send the selected packing to a 3D printer for manufacturing.

Figure 3:
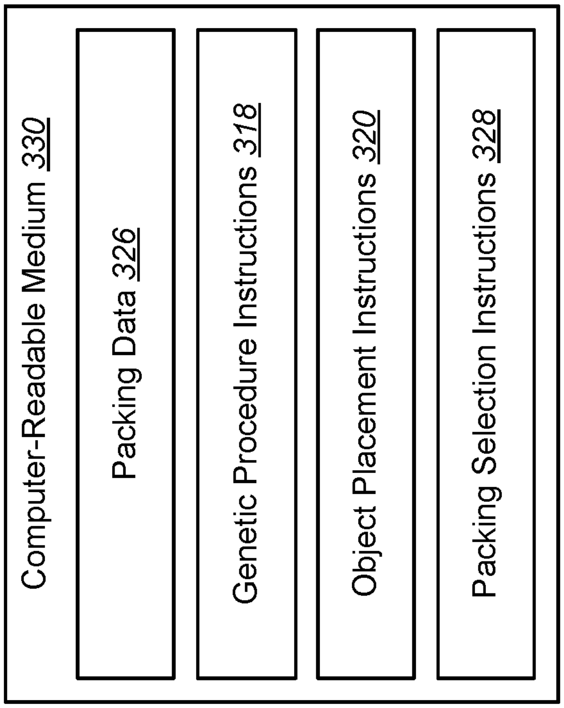
FIG. 3 is a block diagram illustrating an example of a computer-readable medium for determining an object packing with volume subsets.

FIG. 3 is a block diagram illustrating an example of a computer-readable medium 330 for determining an object packing with volume subsets. The computer-readable medium is a non-transitory, tangible computer-readable medium 330. The computer-readable medium 330 may be, for example, RAM, EEPROM, a storage device, an optical disc, and the like. In some examples, the computer-readable medium 330 may be volatile and/or non-volatile memory, such as DRAM, EEPROM, MRAM, PCRAM, memristor, flash memory, and the like. In some examples, the memory 206 described in relation to FIG. 2 may be an example of the computer-readable medium 330 described in relation to FIG. 3.

The computer-readable medium 330 may include code (e.g., data and/or instructions). For example, the computer-readable medium 330 may include packing data 326, genetic procedure instructions 318, object placement instructions 320, and/or packing selection instructions 328.

The packing data 326 may include information indicating a plurality of packings. For example, the packing data 326 may indicate a set of packings, a group of packings, a population of packings, and/or generations of packings. For instance, operations may be performed as described herein to determine a plurality of chromosomes that represent packings. The chromosomes may be stored as packing data 326.

In some examples, the object placement instructions 320 are code to cause the processor to place first objects in a first subset of a volume at static coordinates of the volume. In some examples, placing the first objects in the first subset may be accomplished as described in relation to FIG. 1 and/or FIG. 2. For instance, the object placement instructions 320 are code to cause the processor to locate the first objects at coordinates associated with the first objects. In some examples, stationary objects may have established (x, y, z) (e.g., previously determined) coordinates of a point (e.g., bottom-front-left) corner of each object. In some examples (if the (x, y, z) coordinates are not provided, for instance), the positions of the first objects (e.g., STL models) may be preserved as stationary objects. For instance, the first objects may have an associated attribute or attributes indicating that the first objects are locked and/or not to be moved.

In some examples, the genetic procedure instructions 318 are code to cause a processor to use a genetic procedure to determine orientations of second objects in chromosomes. For instance, the genetic procedure instructions 318 may be instructions to cause a processor to generate chromosomes (e.g., portions of chromosomes), crossover chromosomes (e.g., portions of chromosomes), and/or mutate chromosomes (e.g., portions of chromosomes). For example, the genetic procedure may randomly initialize orientations of second objects in chromosomes, evaluate the chromosomes (e.g., portions of chromosomes), crossover the chromosomes (e.g., portions of chromosomes), and/or mutate the chromosomes (e.g., portions of chromosomes) to determine orientations of the second objects. In some examples, the genetic procedure may be used to determine orientations as described in relation to FIG. 1 and/or FIG. 2.

In some examples, the object placement instructions 320 may include code to cause the processor to determine placements of the second objects in a second subset of the volume based on the chromosomes. For instance, the object placement instructions 320 may include code to cause the processor to use a placement procedure (e.g., bottom-front-left placement procedure, etc.) to place the second objects in the second subset. In some examples, the second subset is bounded by the first subset. For instance, the placement procedure may place the second objects in a space constrained by the dimensions of the second subset.

In some examples, the code to cause the processor to determine placements comprises code to cause the processor to determine the placements based on sequences of objects indicated in the chromosomes. For instance, the second objects may be placed in an order indicated by sequences of the chromosomes (e.g., in a second portion of the chromosomes). For instance, consecutive objects (e.g., genes) in the chromosome may be placed in order in the second subset of the volume (e.g., build volume). In some examples, determining the placements of the second objects in the second subset of the volume based on the chromosomes may be performed as described in relation to FIG. 1 and/or FIG. 2.

In some examples, the packing selection instructions 328 are code to cause the processor to determine a packing based on the placements. For instance, the packing may be selected from the placements based on values, fitness scores, quantities of objects in the placements (e.g., packings), object densities, and/or heights of the placements (e.g., packings). In some examples, the packing selection instructions 328 are code to cause the processor to determine values, fitness scores, quantities of objects in the placements (e.g., packings), object densities, and/or heights of the placements (e.g., packings). For instance, the processor may execute the genetic procedure instructions 318 to determine, look-up, count, etc., the quantities of objects of the placements (in the second subset, in the volume, etc.).

In some examples, the packing selection instructions 328 are code to cause the processor to determine fitness scores of the placements (e.g., chromosomes). For instance, the processor may determine a density and/or height (e.g., z-dimension) for placements (e.g., packings) indicated by the chromosomes. For instance, the fitness score may be a height of the placement (e.g., chromosome) and/or a density of the placement (e.g., chromosome). In some examples, determining the fitness score of the placement (e.g., chromosome) may be performed as described in relation to FIG. 1 and/or FIG. 2.

In some examples, the packing selection instructions 328 are code to cause the processor to determine a packing based on the values, fitness scores, quantities of objects in the placements (e.g., packings), object densities, and/or heights of the placements (e.g., packings). For instance, the packing selection instructions 328 may cause a processor to determine a best packing in terms of values, fitness scores, quantities of objects in the placements (e.g., packings), object densities, and/or heights of the placements (e.g., packings) from a set (e.g., generation or generations) of chromosomes. In some examples, determining the packing may be performed as described in relation to FIG. 1 and/or FIG. 2.

In some examples, the packing selection instructions 328 may include code to cause the processor to rank chromosomes with hierarchical criteria based on values, fitness scores, quantities of objects in the placements (e.g., packings), object densities, and/or heights of the placements (e.g., packings). The hierarchical criteria may include criteria with varying priority. For instance, the quantity of objects may be a criterion with a top priority and the fitness score may be a criterion with a next lower priority. In the hierarchical criteria, the processor may determine if there is a chromosome (e.g., placement, packing) with a best top priority criterion. If there is more than one chromosome with a best top priority criterion (e.g., multiple chromosomes with the same maximum quantity of packed objects), the selection may utilize the next lowest criterion. If there is more than one chromosome with a best next lowest criterion (e.g., multiple chromosomes with the same fitness scores or fitness scores within a range), the selection may utilize the next lower priority criterion (e.g., lowest priority).

To determine a packing in some examples, packing scores may be compared. A packing score is a score indicating a value or a combination of values (e.g., quantity of objects packed, fitness score, packing height, and/or packing density, etc.). An example of packing selection is given as follows. Assume two packings A and B with corresponding packing scores s_A and s_B. In some examples, a packing score s_X may include parameters (e.g., k parameters or values): s_X={p1_X, p2_X, . . . , pk_X}, where px_X is a parameter or value. A quantity (e.g., k) of threshold values may be utilized: a, β, . . . , φ. If the first k−1 parameters of each packing are relatively closer to each other (up to an adjustable threshold), a Boolean value of (p1_A>p1_B) may indicate whether s_A is greater than s_B. For instance, In a case that abs(p1_A−p1_B)<a and abs(p2_A−p2_B)<p and so on for the rest of the parameters, and (pk_A !=pk_B), then a Boolean value of (pk_A>pk_B) may indicate whether s_A is greater than s_B. Otherwise, a parameter number k−1 may be compared. For instance, in a case that abs(p1_A−p1_B) <a and abs(p2_A−p2_B)<p and so on for the rest of the parameters, and (pk−1_A !=pk−1_b), then a Boolean value of (pk−1_A>pk−1_13) may indicate whether s_A is greater than s_B. Otherwise, similar comparisons may be made for a parameter or parameters (e.g., pk−2_A !=pk−2_B and so on) until the final case, where (p1_A>p1_B) may indicate whether s_A is greater than s_B. The packing with the greatest score may be selected. In some examples, one parameter or multiple parameters (e.g., values) may be utilized in the comparison.

In some examples, the computer-readable medium 330 may include code for causing a processor to manufacture the selected packing. For example, the code may cause a processor to execute instructions and/or send instructions to another device (e.g., 3D printer) to manufacture the selected packing.

Figure 4C:
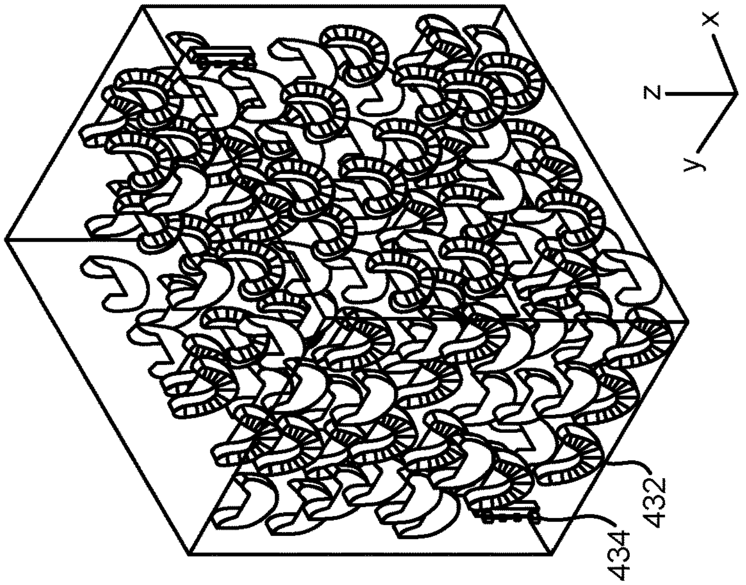
FIG. 4C is a perspective diagram illustrating an example of a packing included the first objects and the second objects in the build volume.
Figure 4B:
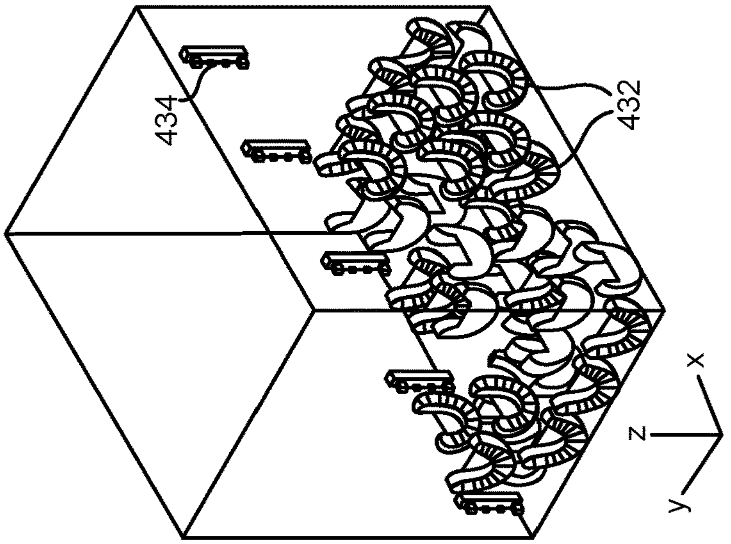
FIG. 4B is a perspective diagram illustrating an example of the first objects with some second objects arranged around the first objects in the build volume.
Figure 4A:
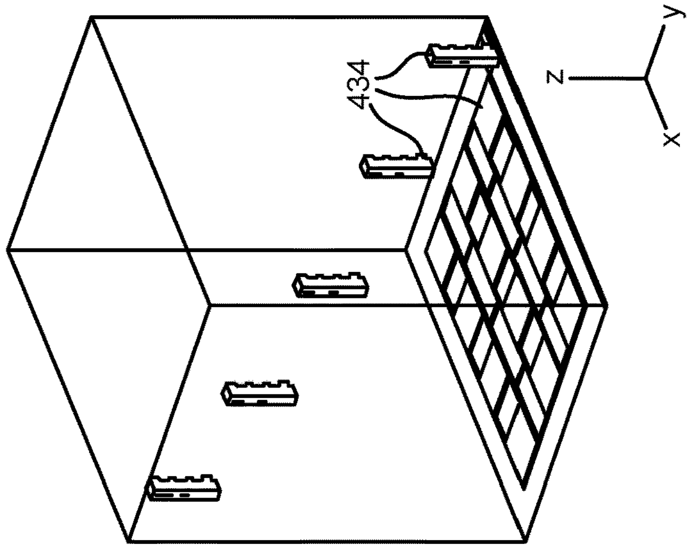
FIG. 4A is a perspective diagram illustrating an example of first objects in a build volume.

FIG. 4A is a perspective diagram illustrating an example of first objects 434 in a build volume. FIG. 4B is a perspective diagram illustrating an example of the first objects 434 with some second objects 432 arranged around the first objects 434 in the build volume. FIG. 4C is a perspective diagram illustrating an example of a packing included the first objects 434 and the second objects 432 in the build volume. FIG. 4A, FIG. 4B, and FIG. 4C are described together.

The first objects 434 may be examples of the first objects described in relation to FIG. 1, FIG. 2, and/or FIG. 3. For example, FIG. 4A illustrates a set of six stationary first objects 434 in the build volume. The first object 434 at the bottom of the build volume may be utilized for calibration. The other stationary first objects 434 that are spread over the z axis may be utilized as proxy objects for printing quality determination. In some examples of the techniques described herein, the placement (e.g., positions and/or orientations) of the first objects 434 may be previously determined and/or static. The first objects 434 may be loaded into the build volume. Loading the first objects 434 may partially fill the build volume.

In some examples of the techniques described herein, an arrangement or placement of the second objects 432 may be determined. For instance, the first objects 434 may occupy (e.g., be coextensive with) a first subset of the build volume. An arrangement or placement of the second objects 432 may be determined in a second subset of the build volume, where the second subset is mutually exclusive from the first subset. For example, a genetic procedure may be used to iterate orientations of the second objects 432. A packing procedure may be used to place the second objects 432 around the first objects 434 (e.g., to place the second objects 432 while avoiding collisions with the first objects 434). A chromosome (e.g., a packing corresponding to a placement and/or chromosome) resulting from the genetic procedure with a best value(s) (e.g., fitness score, packing height, packing density, and/or quantity of packed objects) may be selected as the packing (e.g., the packing illustrated in FIG. 4C).

It may be useful to provide a packing tailored to thermal physics such that the objects placed into the build volume for production has a target yield. It may be useful to increase packing density to increase production throughput, which may reduce manufacturing cost. In some examples, before packing, a build volume may be partially filled by diagnostic objects or other objects that have already-identified fixed locations in the build volume. In some examples, other objects may be placed in the build volume while observing constraints among all objects, including pre-loaded objects and the objects currently being packed.

Some of the techniques described herein may be utilized to pack a build volume that is already partially filled. For example, the pre-loaded objects may be utilized as diagnostic objects, to enable in-situ monitoring, and/or for other purposes.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be implemented within the scope of the disclosure. For example, aspects or elements of the examples described herein may be omitted or combined.

The invention claimed is:

1. A method comprising:

performing, by a processor, a process for a plurality of iterations, wherein the process comprises:
generating chromosomes in a genetic procedure,
wherein the chromosomes respectively indicate different packings of objects in a build volume of an additive manufacturing device, the objects including one or more first objects and a plurality of second objects,
and wherein the first objects have predefined static positions within the build volume that remain fixed over the different packings of the chromosomes during chromosome generation across the iterations, and the second objects have dynamic positions within the build volume that are modifiable during the chromosome generation in each iteration; and
determining fitness measures corresponding to the chromosomes,
wherein the fitness measures determined in each iteration other than a last iteration are used during the chromosome generation in a subsequent iteration;
selecting, by the processor, one of the chromosomes based on at least the fitness measures; and
causing the additive manufacturing device to additively manufacture the objects in the build volume in accordance with the different packing of the objects indicated by the selected chromosome, wherein the genetic procedure includes preserving elite chromosomes across the iterations, generating mutation chromosomes by mutating the elite chromosomes generated in a previous iteration, and generating crossover chromosomes by crossing over pairs of the elite chromosomes, and wherein each pair includes one of the elite chromosomes, and either another of the elite chromosomes or a non-elite chromosome generated the previous iteration.

2. The method of claim 1, wherein the build volume includes first and second subsets of a build volume, wherein the predefined static positions of the first objects are in the first subset, such that the first objects are located within the first subset, and wherein the dynamic positions of the second objects are in the second subset, such that the second objects remain within the second subset over the different packings of the chromosomes during the chromosome generation.

3. The method of claim 2, wherein the first and second subsets are mutually exclusively with one another.

4. The method of claim 1, wherein selecting the one of the chromosomes based on at least the fitness measures comprises:

determining, for each chromosome, values for a plurality of parameters regarding the different packing of the objects indicated by the chromosome; and determining packing scores corresponding to the chromosomes, the packing score of each chromosome determined based on the fitness measure of the chromosome and the values for the parameters that have been determined for the chromosome.

5. The method of claim 1, further comprising:

calibrating the additive manufacturing device based on at least one of the first objects after additive manufacture thereof.

6. The method of claim 1, wherein additive manufacture of at least one of the first objects modifies thermal build material behavior in the build volume.

7. The method of claim 1, wherein at least one of the first objects is a partition in the build volume between the second objects.

8. The method of claim 1, wherein, for each iteration after a first iteration, generating the chromosomes in the genetic procedure comprises:

preserving at least some of the chromosomes generated in the previous iteration for which the fitness measures are greater than a threshold, as the elite chromosomes;

generating the mutation chromosomes, by mutating the elite chromosomes; and generating the crossover chromosomes by either or both of:

crossing two of the elite chromosomes with one another;

crossing one of the elite chromosomes with one of the chromosomes generated in the previous iteration for which the fitness measures are less than the threshold.

9. A system comprising:

a processor; and a memory storing instructions executable by the processor to perform processing comprising:

performing a process for a plurality of iterations, wherein the process comprises:

generating chromosomes in a genetic procedure, wherein the chromosomes respectively indicate different packings of objects in a build volume of an additive manufacturing device, the objects including one or more first objects and a plurality of second objects, and wherein the first objects have predefined static positions within the build volume that remain fixed over the different packings of the chromosomes during chromosome generation across the iterations, and the second objects have dynamic positions within the build volume that are modifiable during the chromosome generation in each iteration; and determining fitness measures corresponding to the chromosomes, wherein the fitness measures determined in each iteration other than a last iteration are used during the chromosome generation in a subsequent iteration;

selecting one of the chromosomes based on at least the fitness measures; and causing the additive manufacturing device to additively manufacture the objects in the build volume in accordance with the different packing of the objects indicated by the selected chromosome, wherein the genetic procedure includes preserving elite chromosomes across the iterations, and either or both of:

generating mutation chromosomes by mutating the elite chromosomes generated in a previous iteration; and generating crossover chromosomes by crossing over pairs of the elite chromosomes, each pair including one of the elite chromosomes, and either another of the elite chromosomes or a non-elite chromosome generated the previous iteration.

10. The system of claim 9, wherein the genetic procedure includes both generating the mutation chromosomes by mutating the elite chromosomes generated in the previous iteration, and generating the crossover chromosomes by crossing over the pairs of the elite chromosomes.

11. The system of claim 9, wherein selecting the one of the chromosomes based on at least the fitness measures comprises:

determining, for each chromosome, values for a plurality of parameters regarding the different packing of the objects indicated by the chromosome; and determining packing scores corresponding to the chromosomes, the packing score of each chromosome determined based on the fitness measure of the chromosome and the values for the parameters that have been determined for the chromosome.

12. The system of claim 9, wherein, for each iteration after a first iteration, generating the chromosomes in the genetic procedure comprises:

preserving at least some of the chromosomes generated in the previous iteration for which the fitness measures are greater than a threshold, as the elite chromosomes;

generating the mutation chromosomes, by mutating the elite chromosomes; and generating the crossover chromosomes by either or both of:

crossing two of the elite chromosomes with one another;

crossing one of the elite chromosomes with one of the chromosomes generated in the previous iteration for which the fitness measures are less than the threshold.

13. A non-transitory computer-readable storage medium storing instructions executable by a processor to perform processing comprising:

performing a process for a plurality of iterations, wherein the process comprises:

generating chromosomes in a genetic procedure, wherein the chromosomes respectively indicate different packings of objects in a build volume of an additive manufacturing device, the objects including one or more first objects and a plurality of second objects, and wherein the first objects have predefined static positions within the build volume that remain fixed over the different packings of the chromosomes during chromosome generation across the iterations, and the second objects have dynamic positions within the build volume that are modifiable during the chromosome generation in each iteration; and determining fitness measures corresponding to the chromosomes, wherein the fitness measures determined in each iteration other than a last iteration are used during the chromosome generation in a subsequent iteration;

selecting, by the processor, one of the chromosomes based on at least the fitness measures; and causing the additive manufacturing device to additively manufacture the objects in the build volume in accordance with the different packing of the objects indicated by the selected chromosome, wherein, for each iteration after a first iteration, generating the chromosomes in the genetic procedure comprises:

preserving at least some of the chromosomes generated in a previous iteration for which the fitness measures are greater than a threshold, as elite chromosomes:

generating mutation chromosomes, by mutating the elite chromosomes; and generating crossover chromosomes by either or both of:

crossing two of the elite chromosomes with one another:

crossing one of the elite chromosomes with one of the chromosomes generated in the previous iteration for which the fitness measures are less than the threshold.

14. The non-transitory computer-readable storage medium of claim 13, wherein selecting the one of the chromosomes based on at least the fitness measures comprises:

determining, for each chromosome, values for a plurality of parameters regarding the different packing of the objects indicated by the chromosome; and determining packing scores corresponding to the chromosomes, the packing score of each chromosome determined based on the fitness measure of the chromosome and the values for the parameters that have been determined for the chromosome.

* * * * *